United States Patent
Kato et al.

(10) Patent No.: US 12,510,553 B2
(45) Date of Patent: Dec. 30, 2025

(54) AUTOMATIC CHEMICAL ANALYSIS APPARATUS AND ELECTRICAL IMPEDANCE SPECTROMETRY DEVICE

(71) Applicant: Hitachi High-Tech Corporation, Tokyo (JP)

(72) Inventors: Hajime Kato, Tokyo (JP); Yoichiro Suzuki, Tokyo (JP); Gorou Yoshida, Tokyo (JP); Tetsuji Kawahara, Tokyo (JP); Syotaro Sagawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 633 days.

(21) Appl. No.: 18/008,566

(22) PCT Filed: Mar. 15, 2021

(86) PCT No.: PCT/JP2021/010389
§ 371 (c)(1),
(2) Date: Dec. 6, 2022

(87) PCT Pub. No.: WO2021/256027
PCT Pub. Date: Dec. 23, 2021

(65) Prior Publication Data
US 2023/0228783 A1    Jul. 20, 2023

(30) Foreign Application Priority Data
Jun. 18, 2020   (JP) ................. 2020-105625

(51) Int. Cl.
*G01N 35/10*    (2006.01)
*G01F 23/296*    (2022.01)
*G01N 35/00*    (2006.01)

(52) U.S. Cl.
CPC ..... *G01N 35/1002* (2013.01); *G01F 23/2966* (2013.01); *G01N 2035/00554* (2013.01)

(58) Field of Classification Search
None
See application file for complete search history.

(56) References Cited

U.S. PATENT DOCUMENTS

| | | |
|---|---|---|
| 6,875,401 B1 | 4/2005 | Suzuki et al. |
| 2010/0112704 A1 | 5/2010 | Tsuda |

(Continued)

FOREIGN PATENT DOCUMENTS

| | | |
|---|---|---|
| JP | 62-73165 A | 4/1987 |
| JP | 2000-338113 A | 12/2000 |

(Continued)

OTHER PUBLICATIONS

Extended European Search Report issued in European Application No. 21824274.1 dated Apr. 24, 2024 (12 pages).

(Continued)

*Primary Examiner* — P. Kathryn Wright
(74) *Attorney, Agent, or Firm* — Crowell & Moring LLP

(57) ABSTRACT

The present invention provides an automatic chemical analysis apparatus and an electrical impedance spectrometry device which make it possible to detect the state of a stirring mechanism prior to performing a stirring operation. The automatic chemical analysis apparatus dispenses a reagent and a sample to be analyzed into a reactor vessel 107, and performs stirring by applying sonic waves to the reactor vessel 107. The automatic chemical analysis apparatus comprises: a piezoelectric element 201 that generates sonic waves; a plurality of split electrodes 211 that are provided to the surface of the piezoelectric element 201; a power amplifier 203 that causes the piezoelectric element 201 to generate sonic waves by applying a voltage to each of the split electrodes 211; and a host computer and impedance measuring circuit that measure the electrical impedance spec- (Continued)

trum of each split electrode 211 by applying a voltage to each of the split electrodes 211.

6 Claims, 13 Drawing Sheets

(56) References Cited

U.S. PATENT DOCUMENTS

| | | | |
|---|---|---|---|
| 2014/0147348 A1* | 5/2014 | Katou | G01N 35/025 422/509 |
| 2016/0121611 A1 | 5/2016 | Reinten et al. | |

FOREIGN PATENT DOCUMENTS

| | | |
|---|---|---|
| JP | 2003-254979 A | 9/2003 |
| JP | 3641992 B2 | 4/2005 |
| JP | 3661076 B2 | 6/2005 |
| JP | 3746239 B2 | 2/2006 |
| JP | 2007-40843 A | 2/2007 |
| JP | 4112228 B2 | 7/2008 |
| JP | 4406629 B2 | 2/2010 |
| JP | 2010-96638 A | 4/2010 |
| JP | 2019-124608 A | 7/2019 |
| WO | WO-0177691 A1 * | 10/2001 .............. B01F 31/87 |

OTHER PUBLICATIONS

International Search Report (PCT/ISA/210) issued in PCT Application No. PCT/JP2021/010389 dated May 11, 2021 with English translation (four (4) pages).

Japanese-language Written Opinion (PCT/ISA/237) issued in PCT Application No. PCT/JP2021/010389 dated May 11, 2021 (three (3) pages).

Japanese-language International Preliminary Report on Patentability (PCT/IPEA/416 & PCT/IPEA/409) issued in PCT Application No. PCT/JP2021/010389 dated Jan. 12, 2022 (nine (9) pages).

Katou et al., "Development of Non-Contact Micro-Liquid Mixing Method and Application to Chemical Auto-Analyzers", Chemical Engineering Science, 2005, pp. 5519-5528, vol. 60, (10 pages).

* cited by examiner

[FIG. 1]
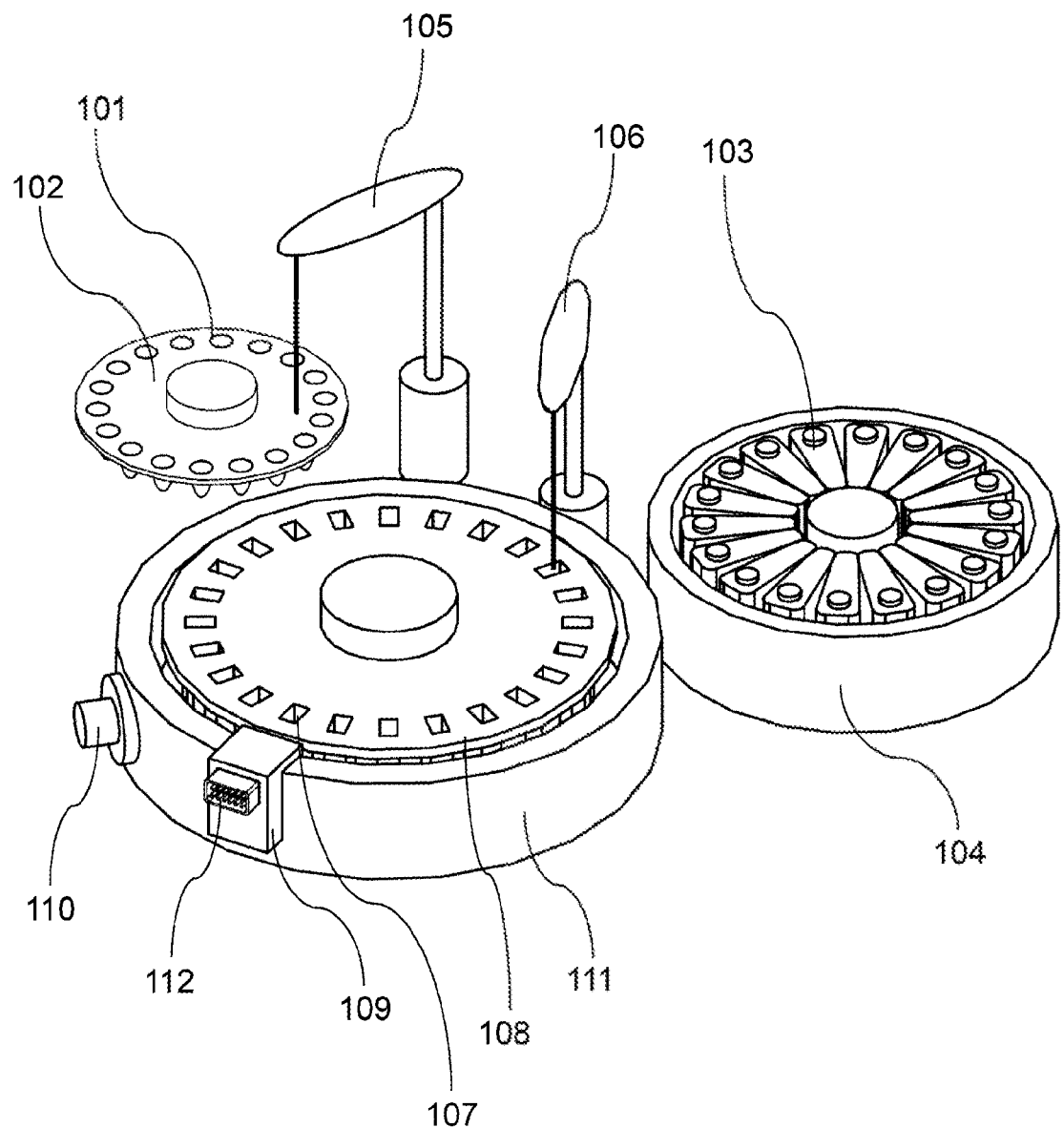

[FIG. 2]
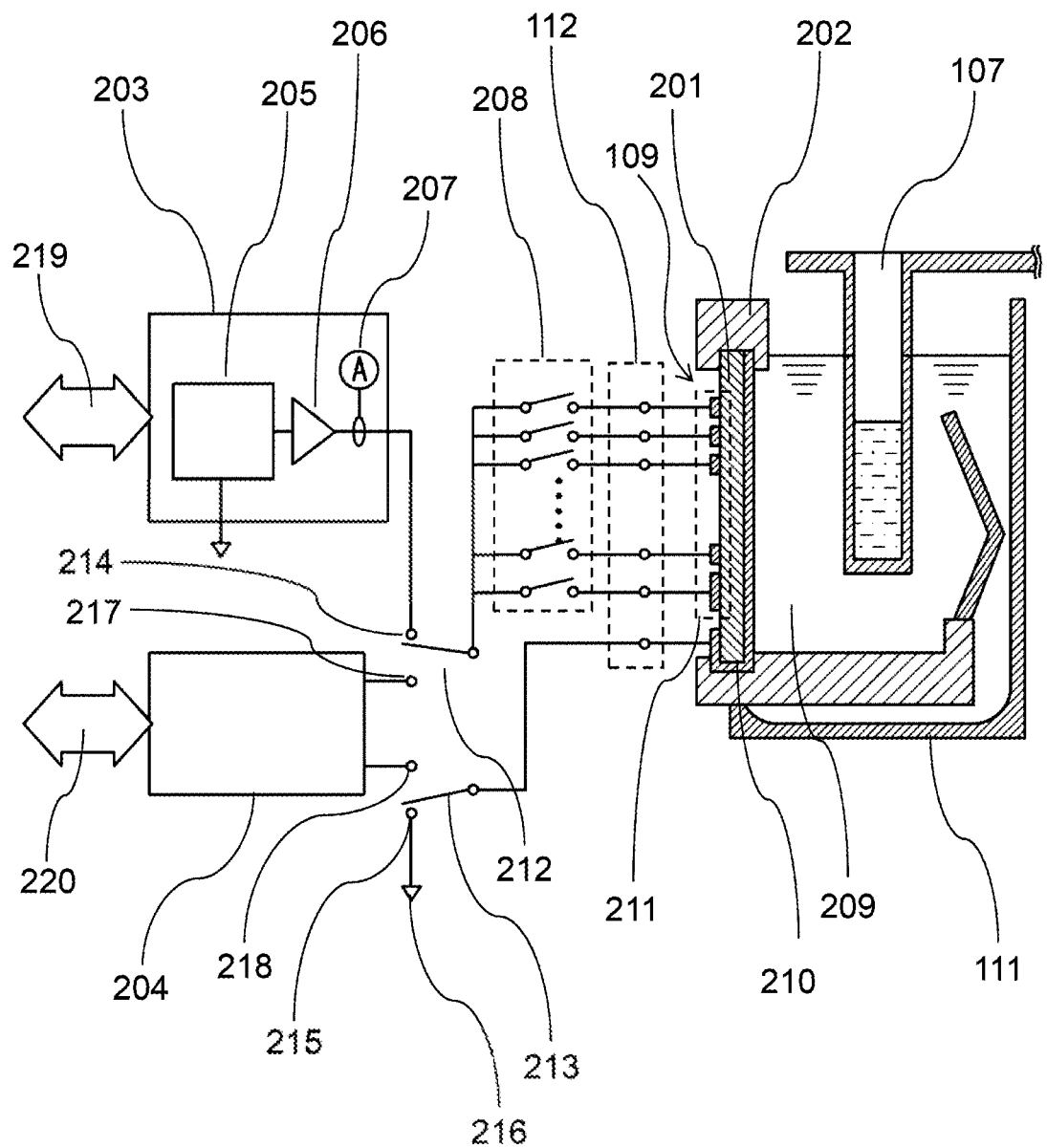

[FIG. 3]
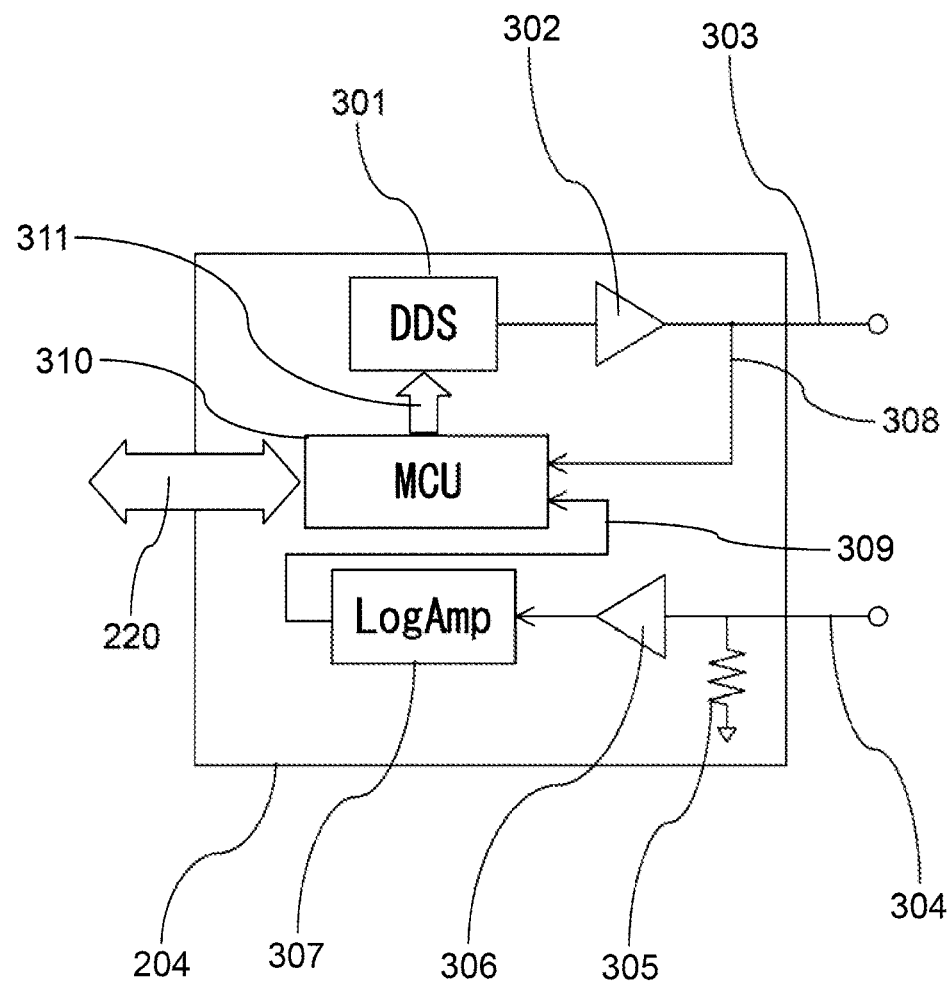

[FIG. 5]
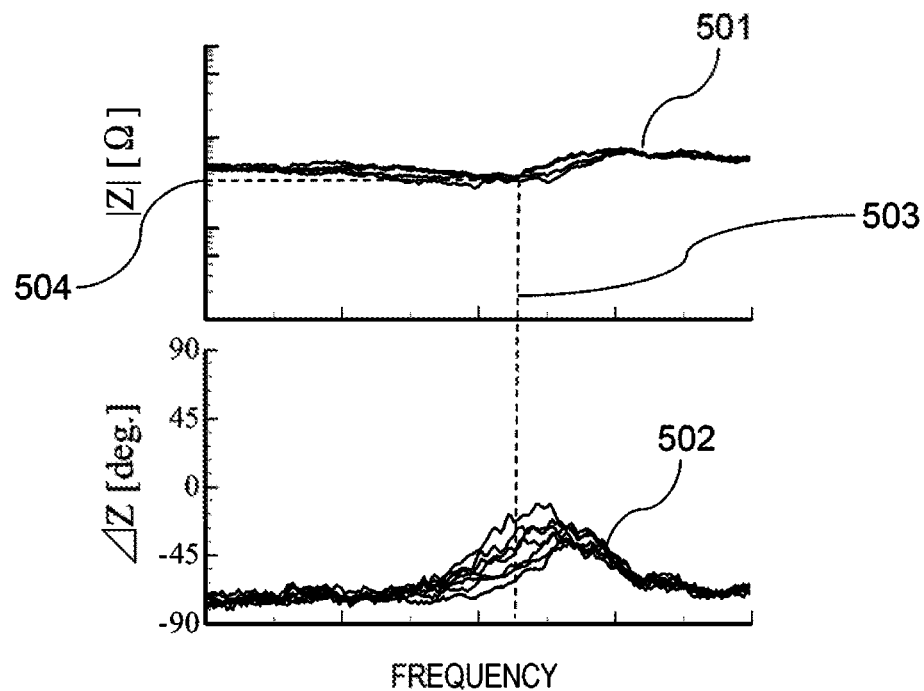
EXAMPLE: DETERMINE WHETHER OR NOT PIEZOELECTRIC ELEMENT
IS NORMAL BASED ON IMPEDANCE

[FIG. 6]
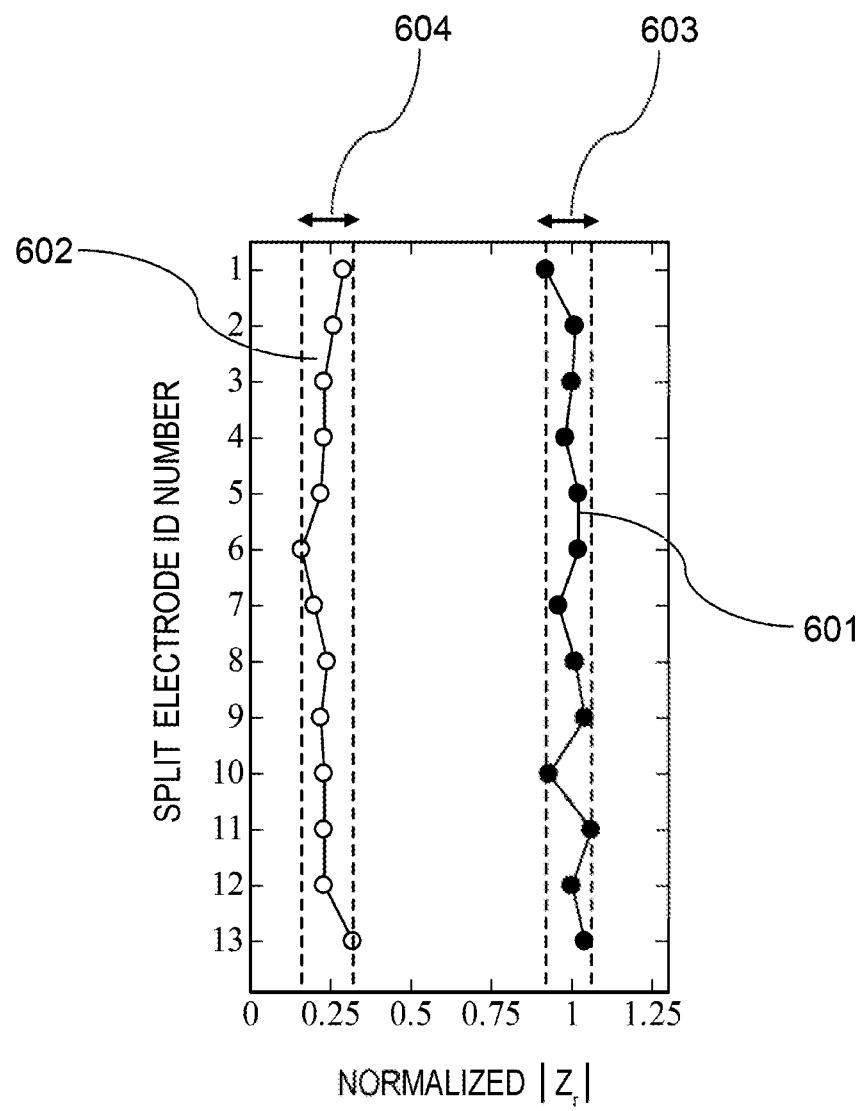

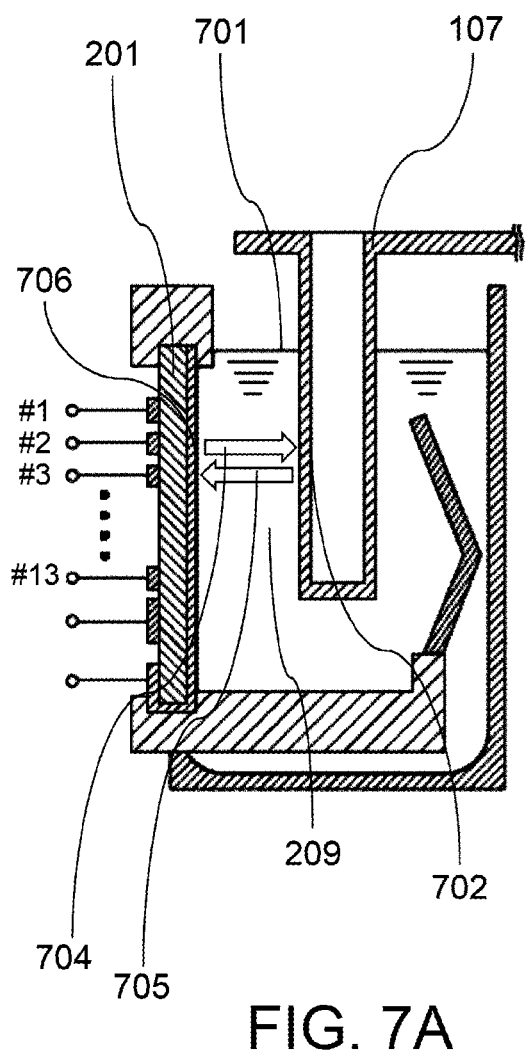
FIG. 7A
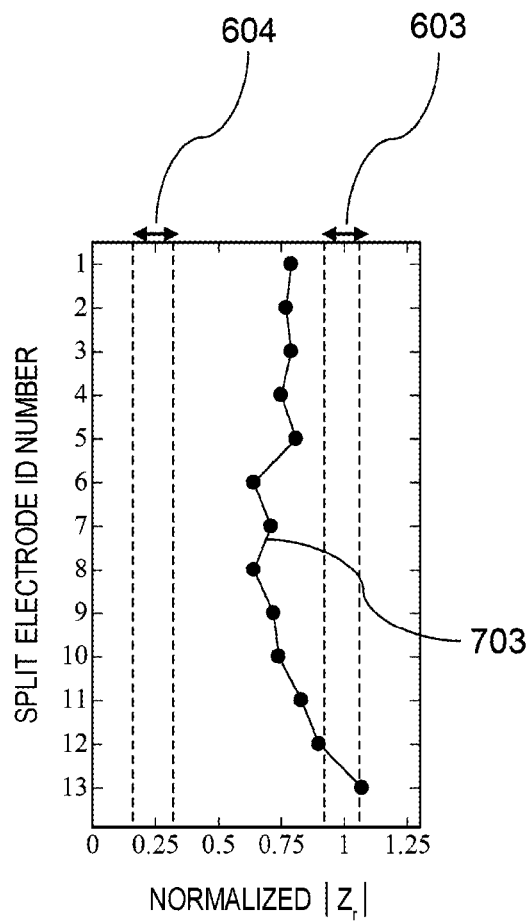
FIG. 7B
EXAMPLE: DETECT LIQUID SURFACE POSITION OF LIQUID TO BE STIRRED BASED ON IMPEDANCE AND APPLY VOLTAGE ACCORDING TO LIQUID SURFACE POSITION

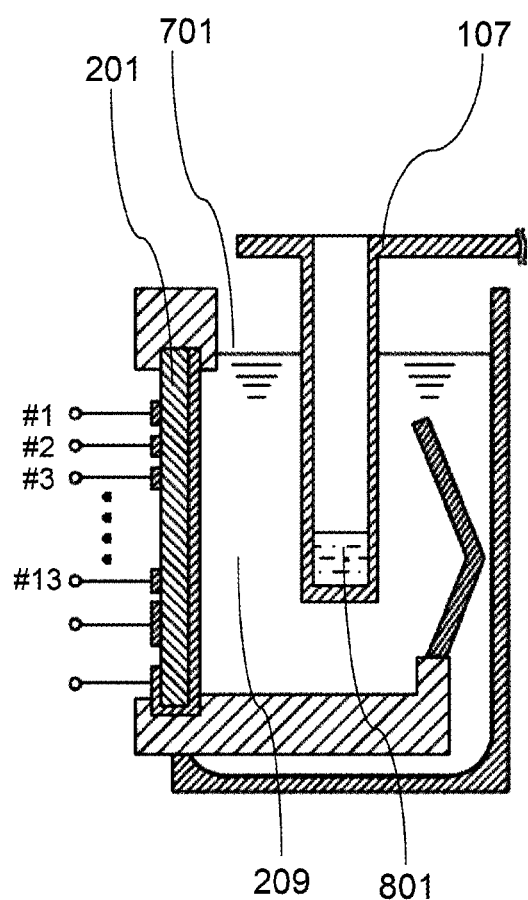
FIG. 8A
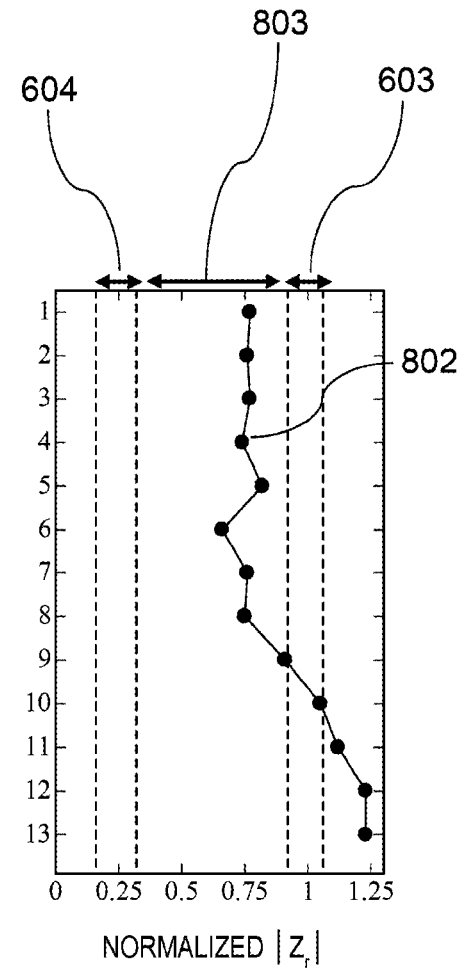
FIG. 8B
EXAMPLE: DETECT LIQUID SURFACE POSITION OF LIQUID TO BE STIRRED BASED ON
IMPEDANCE AND APPLY VOLTAGE ACCORDING TO LIQUID SURFACE POSITION

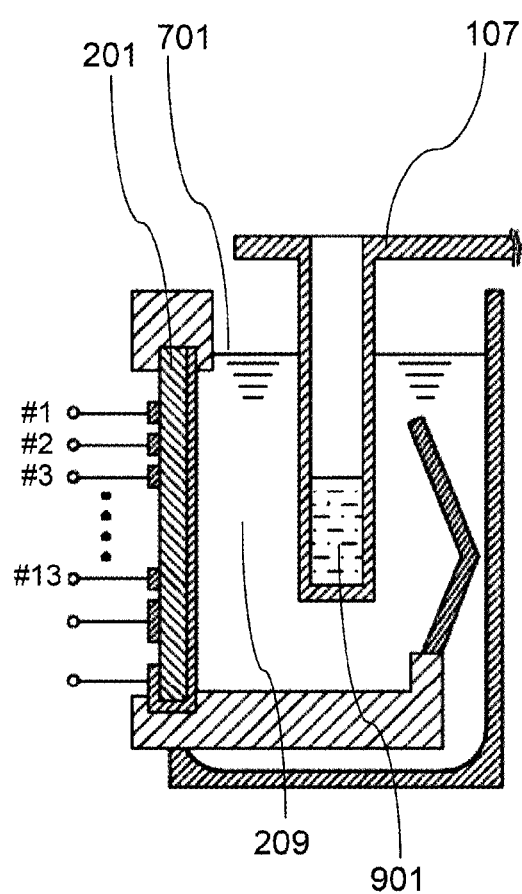
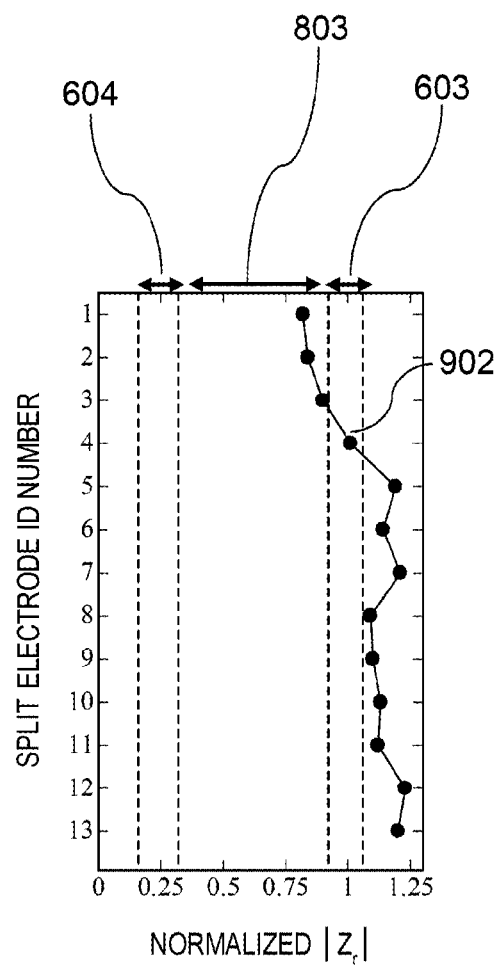
FIG. 9A
FIG. 9B
EXAMPLE: DETECT LIQUID SURFACE POSITION OF LIQUID TO BE STIRRED BASED ON IMPEDANCE AND APPLY VOLTAGE ACCORDING TO LIQUID SURFACE POSITION

↓

EXAMPLE: DETECT LIQUID SURFACE POSITION OF LIQUID TO BE STIRRED BASED ON IMPEDANCE AND APPLY VOLTAGE ACCORDING TO LIQUID SURFACE POSITION

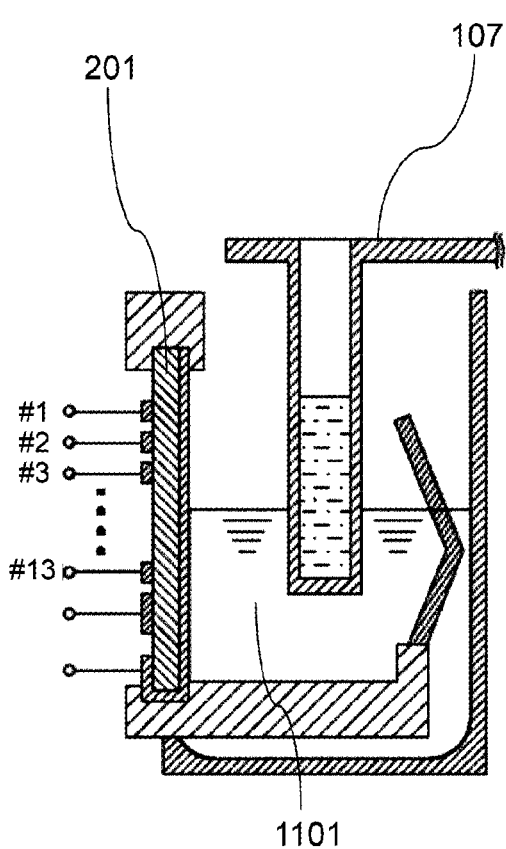
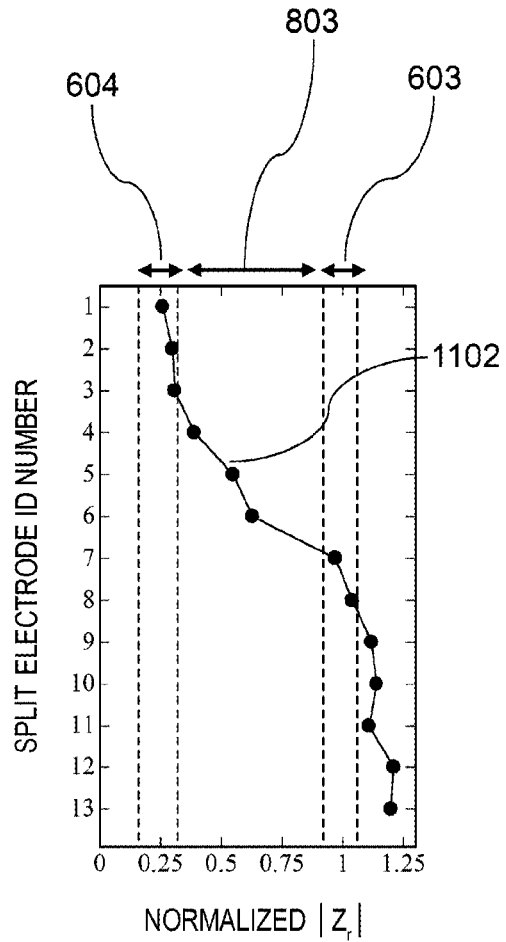
FIG. 11A  FIG. 11B
EXAMPLE: DETERMINE WHETHER OR NOT PIEZOELECTRIC ELEMENT IS IN CONTACT WITH CONSTANT-TEMPERATURE WATER BASED ON IMPEDANCE AND DETERMINE WHETHER OR NOT TO STIR

[FIG. 12]
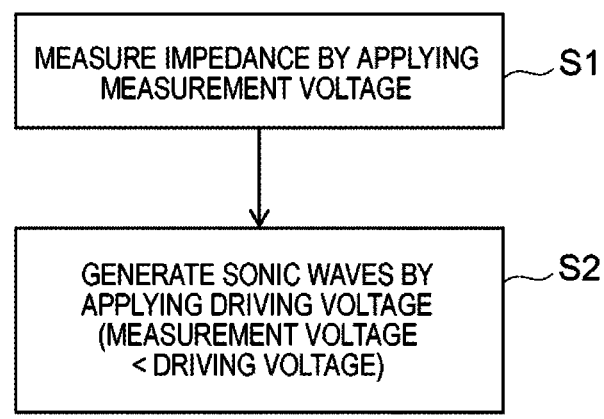

AUTOMATIC CHEMICAL ANALYSIS APPARATUS AND ELECTRICAL IMPEDANCE SPECTROMETRY DEVICE

TECHNICAL FIELD

The present invention relates to an automatic chemical analysis apparatus, in particular, in which a reagent and a sample in a reactor vessel are stirred by sonic waves. The present invention also relates to an electrical impedance spectrometry device connectable to such an automatic chemical analysis apparatus.

BACKGROUND ART

According to JP-B-3641992 (PTL 1), JP-B-3661076 (PTL 2), JP-B-4406629 (PTL 3), JP-B-3746239 (PTL 4), JP-B-4112228 (PTL 5) and Chemical Engineering Science 60 (2005) pp. 5519-5528 (NPTL 1), a technique for mixing a liquid to be stirred (a sample and a reagent) in a reactor vessel in a non-contact state by using the effect of the acoustic radiation pressure of strong ultrasonic waves is developed and is mounted on an automatic chemical analysis apparatus for practical use.

In this technique, sine waves or rectangular waves or the like are applied to a piezoelectric element at a frequency near the thickness resonance frequency of the piezoelectric element to generate ultrasonic waves, and ultrasonic waves are radiated to the liquid to be stirred from the outside of the reactor vessel, thereby mixing the liquid to be stirred.

The automatic chemical analysis apparatus equipped with such an ultrasonic non-contact stirring technique (hereinafter, referred to as "the stirring technique") is expected to be used for more than a few years from introduction to a user site. Accordingly, the function of checking whether each stirring operation is properly performed during the operation of the automatic analysis apparatus is required, as with other mechanisms (dispensing mechanism, cleaning mechanism, and the like) constituting the automatic analysis device.

In particular, according to PTL 4, in the operation of the stirring technique, a current flowing to a piezoelectric element is always measured and recorded, and whether or not proper stirring is performed is determined by measuring whether a prescribed current is flowing. When the prescribed current is not flowing, it is determined that no desired ultrasonic waves are generated from the piezoelectric element which is the source of the ultrasonic waves, and an abnormality, an error, and an alert in the stirring operation are presented to a user by an automatic analysis apparatus.

CITATION LIST

Patent Literature

PTL 1: JP-B-3641992
PTL 2: JP-B-3661076
PTL 3: JP-B-4406629
PTL 4: JP-B-3746239
PTL 5: JP-B-4112228

Non-Patent Literature

NPTL 1: Chemical Engineering Science 60 (2005) pp. 5519-5528

SUMMARY OF INVENTION

Technical Problem

However, in the technique in the related art, there is a problem that it is difficult to detect the state of a stirring mechanism before executing a stirring operation.

In the technique described in PTL 4, for example, when the stirring operation is performed once, the waveform and value of the current flowing to the piezoelectric element are collated with the preset prescribed waveform and value to determine the presence or absence of an abnormality in the stirring mechanism. Therefore, the determination is made after the stirring operation.

If an abnormality cannot be detected in the stirring mechanism before the stirring operation, the reagent and the sample used in the stirring operation may be wasted.

When an abnormality is detected in the stirring mechanism as a result of the stirring operation, the operation of the automatic analysis apparatus may be interrupted. It is important to analyze a desired number of samples in a limited time since the automatic chemical analysis apparatus performing analysis of hundreds of samples per hour or more is often used for biochemical analysis of blood in the inspection department or the inspection center of a medium or large-sized hospital. Therefore, it is not desirable that the operation of the automatic analysis apparatus is interrupted.

The present invention is made to solve these problems and aims to provide an automatic chemical analysis apparatus and an electrical impedance spectrometry device capable of detecting the state of a stirring mechanism before executing a stirring operation.

Solution to Problem

An example of an automated chemical analysis apparatus according to the present invention is an automated chemical analysis apparatus that dispenses a reagent and a sample to be analyzed into a reactor vessel and performs stirring by applying sonic waves to the reactor vessel, wherein
the automatic chemical analysis apparatus includes
a piezoelectric element that generates the sonic waves, a plurality of electrodes that are provided to the surface of the piezoelectric element,
a driver that causes the piezoelectric element to generate the sonic waves by applying a voltage to each of the electrodes, and
an electronic circuit that measures the electrical impedance spectrum of each of the electrodes by applying a voltage to each of the electrodes.

An example of an electrical impedance spectrometry device according to the present invention is an electrical impedance spectrometry device that is connectable to an automatic chemical analysis apparatus, wherein
the automatic chemical analysis apparatus has a function of dispensing a reagent and a sample to be analyzed into a reactor vessel and performing stirring by applying sonic waves to the reactor vessel,
the automatic chemical analysis apparatus includes a piezoelectric element that generates the sonic waves,
a plurality of electrodes that are provided to the surface of the piezoelectric element, and
a driver that causes the piezoelectric element to generate the sonic waves by applying a voltage to each of the electrodes, and the electrical impedance spectrometry device includes an electronic circuit that measures the electrical impedance spectrum of each of the electrodes, an input device for inputting an operation instruction to the electronic circuit, a display device that displays information based on the measured electrical impedance spectrum, a cable that connects the electronic circuit and each of the electrodes, and a switch device that switches the connection of the electronic circuit and each of the electrodes.

The present specification includes the disclosure of Japanese patent application number 2020-105625, which is the basis of the priority of the present application.

Advantageous Effects of Invention

With the automatic chemical analysis apparatus and the electrical impedance spectrometry device according to the present invention, it is possible to detect the state of a stirring mechanism before executing a stirring operation.

For example, not only an abnormality is detected as a result of the stirring operation, but an abnormality is detected beforehand so that a stable and continuous operation can be performed.

If it is possible to detect any problem with a stirring mechanism before performing the stirring operation and to achieve the function of waiting for the stirring operation, a reagent or a sample used in the stirring operation is not wasted. Further, if the frequency of occurrence of the problem and the cause of the problem can be estimated, it is possible to take measures (re-adjustment, replacement of consumable parts, and the like) for the automatic chemical analysis apparatus in advance.

Since the possibility of interruption of the operation of the automatic analysis apparatus can be reduced, the stable and continuous operation of the automatic chemical analysis apparatus can be performed even in the inspection department or the inspection center of a medium or large-sized hospital.

BRIEF DESCRIPTION OF DRAWINGS

FIG. 1 is a diagram showing an example of the configuration of an automatic chemical analysis apparatus according to Example 1 of the present invention.

FIG. 2 is a diagram showing an example of the configuration of the stirring mechanism in FIG. 1.

FIG. 3 is a diagram showing an example of the configuration of the impedance measurement circuit in FIG. 2.

FIG. 5 is a diagram showing an example of a result of measuring the electrical impedance spectrum of an abnormal piezoelectric element.

FIG. 6 is a diagram showing an example of a result of measuring the electrical impedance spectrum obtained from the normal piezoelectric element.

FIGS. 7A and 7B are diagrams showing an example of a state in which the liquid surface position of constant-temperature water is a proper position and there is no liquid to be stirred inside a reactor vessel, and an example of an electrical impedance spectrum measurement result in that state.

FIGS. 8A and 8B are diagrams showing an example of a state in which the liquid surface position of the constant-temperature water is the proper position and the amount of a liquid to be stirred is about one-third of a proper amount, and an example of an electrical impedance spectrum measurement result in that state.

FIGS. 9A and 9B are diagrams showing an example of a state in which the liquid surface position of the constant-temperature water is the proper position and the amount of the liquid to be stirred is about two-thirds of the proper amount, and an example of an electrical impedance spectrum measurement result in that state.

FIGS. 11A and 11B are diagrams showing an example of a state in which the liquid to be stirred is filled with more than the amount of liquid that can be mixed, but a water level of a constant-temperature bath is lowered, and an example of an electrical impedance spectrum measurement result in that state.

FIG. 12 is a diagram showing an example of an operation procedure of an automatic chemical analysis apparatus according to Example 2 of the present invention.

DESCRIPTION OF EMBODIMENTS

Figure 4A:
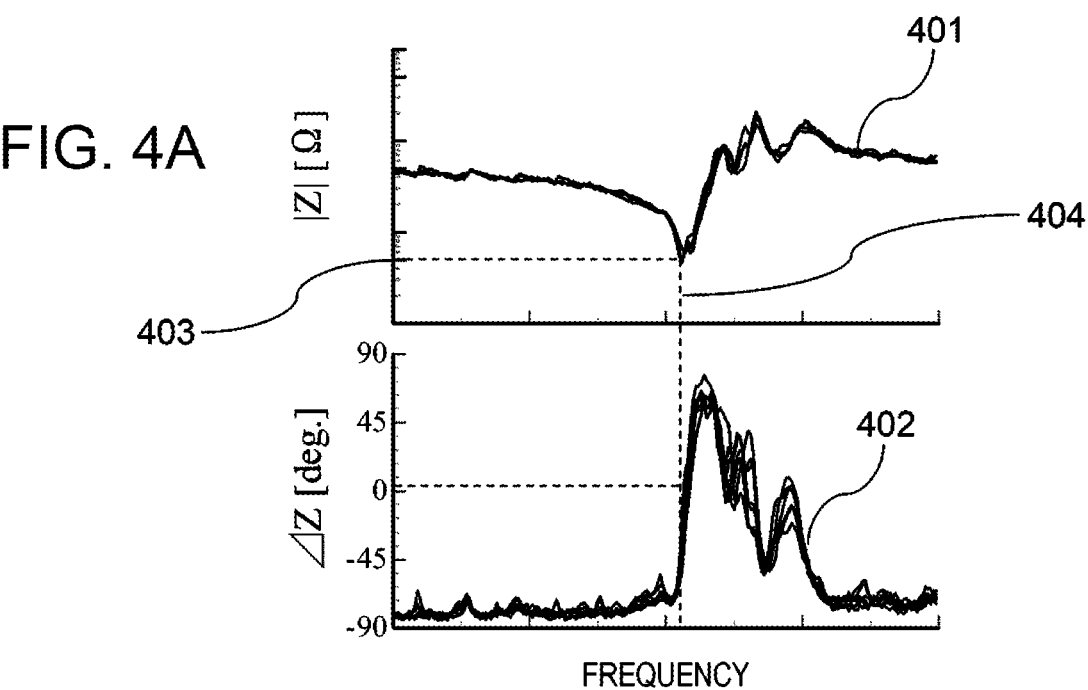
FIGS. 4A and 4B are diagrams showing an example of a result of measuring the electrical impedance spectrum of a normal piezoelectric element.

Examples of the present invention are described below. The electronic components used in the present example are suitable and easy to procure at the time of filing of the present invention, but it is highly likely that the electronic components with particularly remarkable progress will be distributed in the future. In this case, when it is possible to replace the component used for the implementation of the present invention, it may be preferable to use components with higher performance.

Example 1

FIG. 1 shows an example of the configuration of an automatic chemical analysis apparatus according to Example 1. FIG. 2 shows an example of the configuration of a stirring mechanism according to Example 1.

As shown in FIG. 1, the following configurations are mounted on the automatic chemical analysis apparatus according to the present example.

- a sample cup 101 that contains samples to be analyzed
- a sample disk 102 for installing a plurality of the sample cups 101
- a reagent bottle 103 that contains a reagent
- a reagent cooling disk 104 for cooling the reagent bottle 103
- a sample dispenser 105 for dispensing a sample
- a reagent dispenser 106 for dispensing a reagent
- a reactor vessel 107 in which a sample and a reagent are dispensed
- a reaction disk 108 in which the reactor vessel 107 is disposed
- a stirring mechanism 109 for stirring a liquid to be stirred in the reactor vessel 107
- an absorbance meter 110 that specifies absorbance characteristics in the reactor vessel 107

An automatic chemical analysis apparatus dispenses a sample and a reagent into the reactor vessel 107 by the sample dispenser 105 and the reagent dispenser 106, respectively. Thus, a liquid to be stirred is generated in the reactor vessel 107. The reactor vessel 107 in which a sample and a reagent have been dispensed is disposed on the reaction disk 108 along the circumferential direction. The reactor vessel 107 rotates clockwise in this example. The liquid to be stirred in the reactor vessel 107 is stirred and mixed in a non-contact state in the stirring mechanism 109. The mixed sample and reagent are accelerated in reaction, and the absorbance characteristics are measured by the absorbance meter 110. After the absorbance measurement (that is, analysis) is completed, the reactor vessel 107 is cleaned by a cleaning mechanism (not shown). The next sample is dispensed in the reactor vessel 107 after cleaning, and the above-described series of analysis sequences are repeated.

The reactor vessel 107 disposed in the circumferential direction in the reaction disk 108 is in contact with the constant-temperature water circulating in the constant-temperature bath 111 and kept at a constant temperature via the constant-temperature water at a specified temperature. In the present example, constant-temperature water is used as an example of a liquid that mediates sonic waves, but in other examples, the liquid that mediates sonic waves is not limited to constant-temperature liquids, nor is it limited to water.

A host computer (not shown) is mounted on the automatic chemical analysis apparatus. The host computer exchanges signals with the sample disk 102, the reagent cooling disk 104, the sample dispenser 105, the reagent dispenser 106, the reaction disk 108, and the like, and transmits a command thereto, thereby controlling each operation sequence. The host computer controls the operation of the entire automatic chemical analysis apparatus.

The host computer can be configured as a known computer. For example, the host computer includes arithmetic means for performing an operation and storage means for storing information. The arithmetic means is, for example, a processor, and the storage means is, for example, a semiconductor memory and a magnetic disk device. The host computer may also include input means for inputting information, output means for outputting information, communication means for transmitting and receiving information via a communication path, and the like. The input means is, for example, a keyboard and a mouse, the output means is, for example, a display device and a printer, and the communication means is, for example, a network interface.

FIG. 2 is a diagram including a cross section of the stirring mechanism 109 shown in FIG. 1 and is formed by a cross section parallel to the vertical direction and the radial direction of the reaction disk 108. An electric circuit disposed on the host computer side to a connector 112 is shown in a schematic diagram.

The automatic chemical analysis apparatus performs stirring by applying sonic waves to the reactor vessel 107 by the stirring mechanism 109. The automatic chemical analysis apparatus includes the following components.
  a piezoelectric element 201 that generates sonic waves (for example, ultrasonic waves)
  a jig 202 for mounting the piezoelectric element 201 on the constant-temperature bath 111
  split electrodes 211 (a plurality of electrodes) provided on the surface of the piezoelectric element 201 and one or more constant-temperature water side electrodes 210
  a power amplifier 203 (driver) that drives the piezoelectric element 201 by applying a voltage to each electrode to generate sonic waves The stirring mechanism 109 in FIG. 1 includes the connector 112, the piezoelectric element 201, the jig 202, each of the split electrodes 211, and the constant-temperature water-side electrode 210 in FIG. 2. The stirring mechanism 109 is connected to the power amplifier 203 via the connector 112. The power amplifier 203 also operates according to a command from the host computer.

The automatic chemical analysis apparatus includes an impedance measuring circuit 204 for measuring the electrical impedance spectrum (hereinafter, sometimes abbreviated as "ImpS") of the piezoelectric element 201. ImpS of the piezoelectric element 201 is represented, for example, by the collection of ImpS (that is, ImpS between each split electrode 211 and the constant-temperature water side electrode 210) of each of the split electrodes 211.

The piezoelectric element 201 is disposed so that one surface (air side surface) contacts with air and the other surface (constant-temperature water-side surface) contacts with constant-temperature water 209. The split electrode 211 is disposed on the air-side surface, and the constant-temperature water-side electrode 210 is disposed on the constant-temperature water-side surface. A part of the constant-temperature water-side electrode 210 is folded back to the air-side surface along the lower end surface of the piezoelectric element 201 as shown in FIG. 2.

The split electrodes 211 are vertically split as shown by a dashed frame in FIG. 2. In the present example, 14 split electrodes 211 are provided (only some are shown in FIG. 2 or the like). The split electrodes 211 are provided at different height positions. The size and shape of each of the split electrodes 211 can be independently designed, but in the present example, the first to 13-th split electrodes 211 from the top all have the same shape, and only the 14-th (lowest) split electrode 211 is formed slightly longer than the other split electrodes 211. Each of the split electrodes 211 is connected to each pin of the connector 112 in a one-to-one manner.

The power amplifier 203 includes a function generator circuit 205 that generates a driving waveform, a terminal amplifier circuit 206 that amplifies the waveform to a desired power, and a current monitor 207 that measures the current flowing through the piezoelectric element when applying a voltage. The current monitor 207 can be configured to use, for example, an electromagnetic coupling, and the example of the configuration is disclosed in PTL 4.

A relay group 208 is disposed between the power amplifier 203 and the connector 112. The relay group 208 includes a plurality of switches, and the opening and closing of each switch are controlled by a command from the host computer. That is, the relay group 208 functions as a switch device that switches the connection between the power amplifier 203 and each of the split electrodes 211.

For example, the host computer detects the liquid surface position (liquid level) of the liquid to be stirred in the reactor vessel 107 (the example of a detection method will be described below). One or more split electrodes 211 at appropriate positions are selected in accordance with the liquid surface positions. The relay group 208 is controlled to apply a voltage to the selected split electrodes 211. Thus, the position of ultrasonic waves applied to the reactor vessel 107 is adjusted.

Between the power amplifier 203 and the relay group 208, switching switches 212 and 213 are installed for switching between connecting the piezoelectric element 201 and the power amplifier 203 and connecting the piezoelectric element 201 and the impedance measuring circuit 204. During the stirring operation, the switching switch 212 is connected to a terminal 214 of the power amplifier 203, and the switching switch 213 is connected to a terminal 215 (connected to ground 216). On the other hand, when measuring ImpS, the switching switch 212 is connected to an output terminal 217 of the impedance measuring circuit 204, and the switching switch 213 is connected to an input terminal 218 of the impedance measuring circuit 204.

The power amplifier 203 is provided with information communication means 219, and the host computer controls the power amplifier 203 via the information communication means 219. Similarly, the impedance measuring circuit 204 is provided with information communication means 220, and the host computer controls the impedance measuring circuit 204 via the information communication means 220. The impedance measuring circuit 204 transmits the measurement result of ImpS to the host computer via the information communication means 220.

With such a configuration, the impedance measuring circuit 204 and the host computer function as an electronic circuit that measures ImpS of the piezoelectric element 201 by applying a voltage to each of the split electrodes 211. The impedance measuring circuit 204 does not need to be a component independent of the host computer as shown in FIG. 2, and a single electronic circuit in which the impedance measuring circuit 204 and the host computer are integrated may be provided. Further, in the following, the operation of the host computer and the impedance measuring circuit 204 can be implemented as the operation of a single electronic circuit.

FIG. 3 is an example of the configuration of the impedance measuring circuit 204 described in FIG. 2. Inside the circuit, a sine wave voltage of any frequency is generated by a direct digital synthesizer (hereinafter, referred to as DDS) 301. An output terminal 303 outputs the voltage of the waveform through an amplifier 302 that amplifies the voltage.

For example, the output terminal 303 is connected to the split electrode 211 via the relay group 208, and a sine wave voltage is applied to the piezoelectric element 201 via the split electrode 211. The relay group 208 functions as a switch device that switches the connection between the host computer, the impedance measuring circuit 204, and each of the split electrodes 211.

The magnitude of the voltage applied here can be appropriately designed by a person skilled in the art according to the characteristics of the piezoelectric element 201 and the like, but the damage of the piezoelectric element 201 can be prevented by setting a voltage (for example, a voltage called weak voltage) smaller than the voltage applied during the stirring operation. A current flowing in the piezoelectric element 201 when a voltage is applied flows into an input terminal 304 through the constant-temperature water-side electrode 210 and the relay group 208 and is detected as a voltage value by a detection resistor 305.

The voltage signal caused by the current is further amplified by a logarithmic amplifier 307 (Log Amp) through an operational amplifier 306 that linearly amplifies with an appropriate gain. A voltage applied from the output terminal 303 to the piezoelectric element 201 is input to a micro control unit (abbreviated as MCU) 310 via a wiring 308. A voltage value resulting from the current output from the logarithmic amplifier 307 is input to the MCU 310 via a wiring 309. In the example shown in FIG. 3, the logarithmic amplifier 307 is used since the resolution of the A/D converter built in the MCU is assumed to be about 8 to 10 bits, but when an MCU including a higher resolution A/D converter is adopted, a linear amplifier may be used instead of a logarithm amplifier.

The voltage input to the MCU 310 is A/D converted. The MCU 310 sends a control signal 311 to the DDS 301 to cause the frequency of the generated sine waves to sweep through a desired frequency range. The frequency at that time, the applied voltage from the output terminal 303, and the measured voltage corresponding to the current flowing through the piezoelectric element 201 are stored in the memory in the MCU 310 and transmitted to the host computer as the ImpS measurement result through the information communication means 220.

Figure 4B:
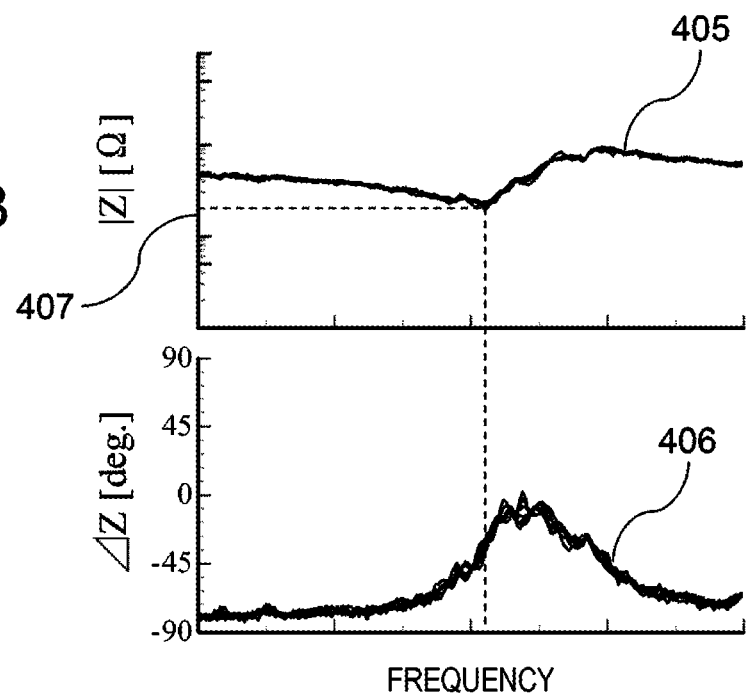

FIG. 4 is an example of a result of measuring the ImpS of a normal piezoelectric element. FIG. 4(a) shows the results when measuring that of the piezoelectric element in air, and FIG. 4(b) shows the results when measuring that of one side of the same piezoelectric element in contact with the constant-temperature water.

In FIG. 4, the absolute value |Z| of the electrical impedance, and the phase difference ΔZ of the applied voltage and current value are plotted with the horizontal axis as a driving frequency. ImpS of each piezoelectric element is measured by using 13 split electrodes having a uniform shape (same width and length).

A profile group 401 of the measured absolute value |Z| and a profile group 402 of the phase difference ΔZ are displayed in FIG. 4(a). All of these measured profiles are uniform profiles. A frequency for which the absolute value is a minimum value 403 is a resonance frequency 404 of the piezoelectric element. The phase difference at the resonance frequency 404 is nearly zero, which indicates a state of a point where this piezoelectric element is changed from capacitive to inductive.

At this frequency, the piezoelectric element is vibrated larger than when driven by other frequencies and is considered to be in a resonance state in the thickness direction of the piezoelectric element. When the piezoelectric element is mass-produced, the resonance frequency may vary by several percent for each piezoelectric element, but the problem of individual difference of the piezoelectric element is solved by using the invention disclosed in PTL 5 in the experiment in FIG. 4.

A profile group 405 of the measured absolute value |Z| and a profile group 406 of a phase difference ΔZ are displayed in FIG. 4(b).

When comparing the ImpS measurement results in the air shown in FIG. 4(a) with the ImpS measurement results shown in FIG. 4(b) in which one side thereof is in contact with water, the resonance frequency is almost unchanged, but the impedance value at the resonance frequency becomes a value 407 in the latter state, which becomes higher than the value 403 in the former. In the case of FIG. 4(b), the vibration of the surface of the piezoelectric element on the side in contact with the constant-temperature water propagates to the constant-temperature water, and ultrasonic waves are applied from the surface of the piezoelectric element. Since the specific acoustic impedance of water is 3,000 times or more than that of air and the high acoustic impedance increases the acoustic load, which increases the electrical impedance accordingly. In the present example, using this characteristic, the detection of the liquid surface position of the constant-temperature water and the detection of the liquid surface position of the liquid to be stirred in the reactor vessel are performed, as described below.

FIG. 5 is an example of a result of measuring the ImpS of an abnormal piezoelectric element. In this example, the piezoelectricity disappeared at a partial region of the piezoelectric element. As in FIG. 4(b), the results are shown when one side of the piezoelectric element is measured in contact with the constant-temperature water.

The profile obtained from the split electrode corresponding to the region where the piezoelectricity is lost is different from the profile obtained from the split electrode corresponding to a normal region, and consequently, the profile group is varied. In particular, in the example shown in FIG. 5, a profile group 502 has a large variation in the phase difference ΔZ as compared with the normal profile group 406 in FIG. 4(b). Even in a profile group 501 having the absolute value |Z|, when compared with the normal profile group 405 in FIG. 4(b), sharp resonance characteristics are not obtained, and an impedance value 504 at a frequency 503 which is considered to be a resonance frequency at the normal time is larger than the corresponding value 407 in FIG. 4(b). In other words, the current is less likely to flow, and the irradiation intensity of the ultrasonic waves is reduced compared with that at the normal time.

In the present example, the host computer and the impedance measuring circuit 204 measure ImpS of the piezoelectric element which is a sound source of the stirring technique by the configuration described in FIGS. 1 and 2, and diagnose whether or not the piezoelectric element is normal based on the profile. The specific diagnostic methods and diagnostic criteria may be designed as appropriate by a person skilled in the art, but an example of a standard diagnostic method is described below.

A result of ImpS measurement obtained from each electrode of a normal piezoelectric element (that is, a profile of a frequency spectrum relating to an absolute value of an electrical impedance and a phase difference) is collected beforehand from a large number of normal piezoelectric element specimens, and a statistical population thereof is created. A profile consisting of the absolute value of the electrical impedance and the average value of the phase difference at each frequency is prepared from the population. A normal range based on a standard deviation σ is defined around the average value. For example, the normal range is set to be within the average value ±2 σ.

ImpS is measured for the piezoelectric element to be determined, and it is determined whether or not ImpS is within the normal range. As an example of the determination, when the electrical impedance is within the normal range of all the split electrodes and all the frequencies, the piezoelectric element is determined to be normal, and when the electrical impedance is not within the normal (that is, when the electrical impedance is small or excessive at either frequency for any of the split electrodes), the piezoelectric element is determined to be abnormal. Thus, it is determined whether or not the piezoelectric element is normal based on the ImpS of each of the split electrodes.

The diagnostic method described above is a diagnostic method based on the concept of a statistical assay, but the method using machine learning is also available. For example, a result of measurement obtained by repeatedly performing ImpS measurement from a sample of many normal piezoelectric elements is used as learning data, and a learned model is generated by mechanically training "a profile of a normal piezoelectric element ImpS" in a learning model (for example, the host computer of automatic chemical analysis apparatus). According to the learned model, it is possible to determine whether or not the profile of ImpS of the piezoelectric element to be determined deviates from "the profile of the ImpS of a normal piezoelectric element".

The above is an example of a method for diagnosing whether or not a piezoelectric element is normal. Next, an example of a method for determining whether or not the stirring mechanism 109 is in a state in which the stirring operation can be properly performed is described based on the ImpS measurement result of the piezoelectric element which is known to be normal.

FIG. 6 is an example of the result of the ImpS measurement obtained from a normal piezoelectric element. The vertical axis represents the ID number (starting with the topmost split electrode, 1, 2, ..., 13) of the split electrode of the piezoelectric element. The horizontal axis represents a normalized value (normalized $|Z_r|$) of the absolute value of the electrical impedance (marked as $|Z_r|$) at the time of resonance of each of the split electrodes. A reference value used for normalization is an average value obtained by measuring the profile group 405 (FIG. 4(b)) of the absolute value |Z| in a state in which one side of the piezoelectric element is brought into contact with constant-temperature water, and averaging the impedance value 407 at resonance for all the split electrodes (13 in total).

By dividing the value $|Z_r|$ of each of the split electrodes by the average value, the normalized value is $|Z_r|$. A plot 601 of the normalized $|Z_r|$ is shown in a dot. In the case of the normal piezoelectric element, a range (normal range 603) of the normalized $|Z_r|$ was 0.92 to 1.06.

A plot 602 of the normalized $|Z_r|$ measured in air is shown in a white circle in the graph in FIG. 6 for the same piezoelectric element. The value of the reference used for normalization is the same as in the case of the plot 601. In the plot 602, the variation range (in-air range 604) of the normalized $|Z_r|$ between the split electrodes is 0.16 to 0.32. The plot 602 (measurement in the air) is within a lower range than the plot 601 (measurement in the state in which one side is brought into contact with the constant-temperature water), and the reason is due to the influence of acoustic load on the piezoelectric element as described above.

An example of a method for detecting the liquid surface position of the constant-temperature water and the liquid surface position of the liquid to be stirred in the reactor vessel is described below based on the plots shown in FIG. 6. FIGS. 7 to 11 show an example of a state in which the liquid surface positions of constant-temperature water 209 and 1101 or the liquid surface positions of liquids to be stirred 801, 901, and 1001 are different.

In FIG. 7(a), the liquid surface position of the constant-temperature water 209 is a proper position 701 (for example, a position corresponding to the maximum liquid amount that can be stirred by the stirring mechanism 109), and an example of a state in which there is no liquid to be stirred inside the reactor vessel 107. Since the frequency of the ultrasonic waves used in the present example is about several MHz, the ultrasonic waves irradiated from the piezoelectric element 201 propagate in the constant-temperature water 209 and reach the outer surface of the wall of the reactor vessel 107. Further, the ultrasonic waves pass through the wall of the reactor vessel 107 and reach an inner surface 702.

FIG. 7(b) is a result of ImpS measurement similar to the method described in FIG. 6. In a plot 703, in the split electrode with the ID number #13 (hereinafter, abbreviated as "split electrode #13", the same applies to other split electrodes), the normalized $|Z_r|$ is within the normal range 603 or higher. On the other hand, in the other split electrodes #1 to #12, all the normalized $|Z_r|$ is lower than the normal range 603.

FIG. 8(*a*) shows an example of a state in which the liquid surface position of the constant-temperature water 209 is the proper position 701 and the amount of the liquid to be stirred 801 is about one-third of the proper amount. As for this state, the result of measuring $|Z_r|$ in the same manner as the method described in FIG. 6 is FIG. 8(*b*). In a plot 802 of FIG. 8(*b*), the value of the normalized $|Z_r|$ is large in the split electrodes #13 and #12, but the value starts to decrease from the split electrode #11 and decreases to an intermediate range 803 (that is, the range lower than the normal range 603 and higher than the in-air range 604) in the split electrode #9 and above.

FIG. 9(*a*) shows an example of a state in which the liquid surface position of the constant-temperature water 209 is the proper position 701 and the amount of the liquid to be stirred 901 is about two-thirds of the proper amount. As for this state, the result of measuring $|Z_r|$ in the same manner as the method described in FIG. 6 is FIG. 9(*b*). In a plot 902 in FIG. 9(*b*), the value of the normalized $|Z_r|$ is large in the split electrodes #5 to #13, but the value starts to decrease in the split electrode #5 and above and decreases to the intermediate range 803 in the split electrodes #1 to #3.

Figure 10A:
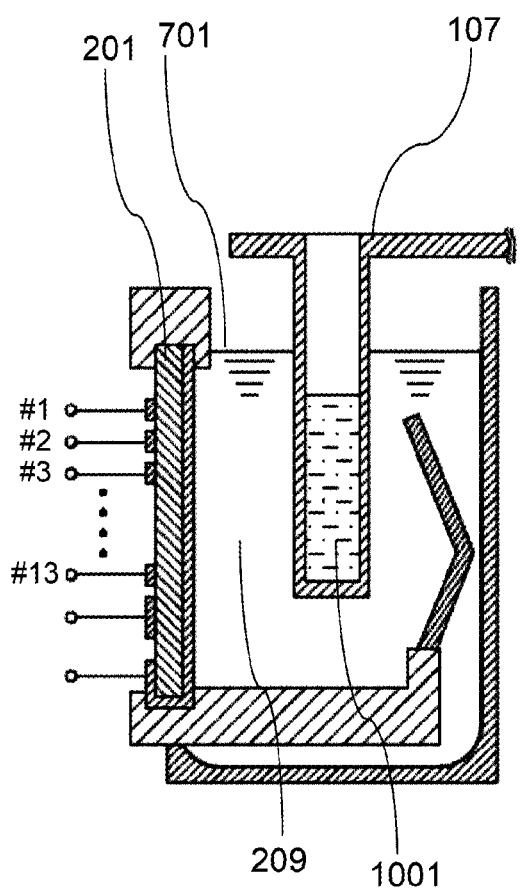
FIGS. 10A and 10B are diagrams showing an example of a state in which the liquid surface position of the constant-temperature water is the proper position and the amount of the liquid exceeds the proper amount, and an example of electrical impedance spectrum measurement results in that state.
Figure 10B:
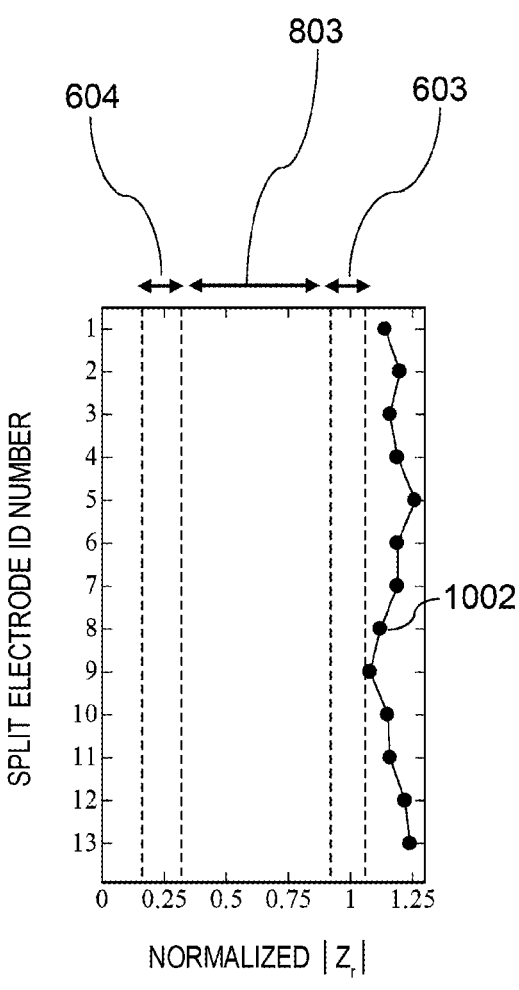

FIG. 10(*a*) shows an example of a state in which the liquid surface position of the constant-temperature water 209 is the proper position 701 and the amount of the liquid to be stirred 1001 exceeds the proper amount. As for this state, the result of measuring $|Z_r|$ in the same manner as the method described in FIG. 6 is FIG. 10(*b*). In a plot 1002 in FIG. 10(*b*), the value of the normalized $|Z_r|$ exceeds the normal range 603 of all the split electrodes.

As described above with reference to FIGS. 6 to 10, since the normalized $|Z_r|$ of the respective split electrodes is different according to the amount of the liquid to be stirred in the reactor vessel, the amount of the liquid to be stirred can be determined based on the normalized $|Z_r|$ of each split electrode. The amount of the liquid to be stirred is expressed, for example, by the liquid surface position of the liquid to be stirred. Thus, the host computer and the impedance measuring circuit 204 detect the liquid surface position of the liquid to be stirred based on the ImpS of each of the split electrodes.

For example, when the normalized $|Z_r|$ are all within the normal range 603 as shown in FIG. 6(*b*), it is possible to determine that the liquid surface position is the proper position. When the value of the normalized $|Z_r|$ decreases to the intermediate range 803 in a specific split electrode and above as shown in FIGS. 7(*b*), 8(*b*), and 9(*b*), it is possible to estimate the liquid surface position according to the position of the split electrode. When all normalized $|Z_r|$ exceeds the normal range 603 as shown in FIG. 10(*b*), it is possible to determine that the liquid surface position is higher than the proper position.

A reference value or a reference range (for example, normal range 603, intermediate range 803, in-air range 604, and the like) to be used for the determination can be stored by performing ImpS measurement under a predetermined condition.

The liquid surface position of the detected liquid to be stirred can be applied to various controls. As an example, the power amplifier 203 can cause the piezoelectric element 201 to generate sonic waves in different modes according to the liquid surface position (that is, according to ImpS of each of the split electrodes).

As an example of the "different modes", a voltage can be applied to different split electrodes according to the liquid surface position. The relation between the liquid surface position and the split electrode to which a voltage is applied can be properly designed by a person skilled in the art. For example, when the liquid surface position is low (for example, FIG. 8), a voltage can be applied only to the split electrodes (for example, split electrodes #10 to #13) at a low position corresponding to the liquid surface position, and when the liquid surface position is high (for example, FIG. 9), a voltage can be applied to the split electrodes (for example, split electrodes #4 to #13) at a higher position.

As another example of the "different modes", the voltage applied to each of the split electrodes can be different according to the liquid surface position. For example, when the liquid surface position is low (for example, FIG. 8), the voltage can be reduced, and when the liquid surface position is high (for example, FIG. 9), the voltage can be increased.

For reference, one of the possible causes of the change in $|Z_r|$ as shown in FIGS. 6 to 10 is described below. Even if the description below is not the main reason, or the description below is not completely applicable, the cause does not affect the experimental results described above and the possibility of application to the present example.

The following is described with reference to FIG. 7(*a*). Ultrasonic waves are propagated from the piezoelectric element 201 to the reactor vessel 107 as progressive waves 704. Ultrasonic waves reaching the reactor vessel 107 are almost fully reflected on the inner surface 702 of the reactor vessel 107, and reflected waves 705 are generated. Thus, standing waves synthesized from the progressive waves 704 and the reflected waves 705 are formed between the inner surface 702 and a surface 706 (vibration surface) on the side of the piezoelectric element 201 which is in contact with the constant-temperature water.

The standing waves have a sound pressure distribution in which the abdomen (a part where the sound pressure becomes maximum or minimum) and a node (a part where the sound pressure becomes zero) are arranged for each half wavelength of the sonic waves in the propagation direction of the sonic waves. Since the ultrasonic waves irradiated from the piezoelectric element 201 on the inner surface 702 of the reactor vessel 107 are almost completely reflected, the sound pressure is almost zero at all times. That is, since the sound pressure is reflected at this position as a free end, a node is formed on the inner surface 702.

On the other hand, when the distance from the surface 706 on the side of the piezoelectric element 201 which is in contact with the constant-temperature water to the inner surface 702 of the reactor vessel 107 is an odd-numbered multiple of half wavelength, the reflected waves 705 are made incident on the surface 706 at the phase of the minimum sound pressure. When the distance is an even-numbered multiple, the reflected waves 705 are incident on the surface 706 at the phase of the maximum sound pressure. Since the sound pressure of the reflected waves 705 affects the acoustic load of the piezoelectric element 201, the electrical impedance of the piezoelectric element 201 varies accordingly.

Thus, when the distance between the surface 706 of the piezoelectric element 201 and the inner surface 702 of the reactor vessel 107 is an integer multiple of half wavelength, the acoustic load of the piezoelectric element 201 becomes maximum or minimum on the surface 706 of the piezoelectric element 201 under the influence of the reflected waves 705. Even when the distance is a non-integer multiple, the acoustic load of the piezoelectric element 201 varies between the maximum and the minimum in accordance with the phase of the reflected waves 705.

The above is an example of a phenomenon in the case where no sonic waves are absorbed in the wall of the constant-temperature water and the reactor vessel 107 which are propagation media of ultrasonic waves. In fact, it is not that there is no influence of the absorption in the propagation media at all, but a sound pressure distribution close to the standing waves is formed between the surface 706 of the piezoelectric element 201 and the inner surface 702 of the reactor vessel 107, and influences the impedance of the piezoelectric element 201 during driving.

By utilizing this phenomenon, when the liquid surface of constant-temperature water is at the proper position 701, it is possible to detect the liquid surface position, that is, the liquid volume of the liquid to be stirred in the reactor vessel 107 from the change of ImpS measured in the respective split electrodes #1 to #13 of the piezoelectric element 201.

Next, a method for detecting the liquid surface position of the constant-temperature water is described with reference to FIG. 11. FIG. 11(a) shows an example of a state in which the liquid to be stirred in the reactor vessel 107 is filled to a liquid volume or more which can be mixed, but the water level (the liquid surface position of the constant-temperature water 1101) in the constant temperature bath is decreased by some abnormality. A plot 1102 of the normalized $|Z_r|$ in this case is shown in FIG. 11(b).

In the plot 1102 of FIG. 11(b), the value of the normalized $|Z_r|$ is within the normal range 603 or higher in the split electrodes #7 to #13, but the value starts to decrease in the split electrode #7 and above and decreases to the in-air range 604 in the split electrodes #1 to #3. When the normalized $|Z_r|$ belongs to the in-air range 604 in any of the split electrodes, it is possible to estimate the position of the constant-temperature water 1101 based on the positions of the split electrodes. Thus, the liquid surface position of the constant-temperature water 1101 can also be detected based on $|Z_r|$.

The liquid surface position of the detected constant-temperature water can be applied to various controls. As an example, whether or not to perform the stirring operation can be determined according to the liquid surface position. That is, the host computer and the impedance measuring circuit 204 determine whether or not the piezoelectric element is in proper contact with the constant-temperature water (that is, whether or not the liquid surface position of the constant-temperature water is sufficiently high) based on ImpS of each of the split electrodes. The power amplifier 203 causes the piezoelectric element to generate sonic waves when the piezoelectric element is in proper contact with the constant-temperature water, and does not cause the piezoelectric element to generate sonic waves when the piezoelectric element is not in proper contact with the constant-temperature water.

As another example, the power amplifier 203 can cause the piezoelectric element 201 to generate sonic waves in different modes according to the liquid surface position of constant-temperature water (that is, according to ImpS of each of the split electrodes).

As an example of the "different modes", a voltage can be applied to different split electrodes according to the liquid surface position. The relation between the liquid surface position and the split electrode to which a voltage is applied can be properly designed by a person skilled in the art. For example, when the liquid surface position is low (for example, FIG. 11), a voltage can be applied only to the split electrodes (for example, split electrodes #7 to #13) at a low position corresponding to the liquid surface position, and when the liquid surface position is high, a voltage can be applied to the split electrodes (for example, split electrodes #4 to #13) at a higher position.

When strong ultrasonic waves are applied to perform the stirring operation in a state in which the constant-temperature water is not at a predetermined water level (that is, when the piezoelectric element is not in proper contact with the constant-temperature water to generate ultrasonic waves with intensity for stirring), not only does the ultrasonic waves not propagate to the reactor vessel, but the vibration energy thereof is accumulated in the piezoelectric element, which can cause a rapid temperature rise. When the temperature rises to a temperature that causes degeneration of a material called a Curie point, the piezoelectricity of the piezoelectric element is irreversibly lost.

The phenomenon shown in the plot 1102 of the normalized $|Z_r|$ obtained from ImpS measurement described in FIG. 11 shows that the automatic chemical analysis apparatus can detect where the liquid surface position of the constant-temperature water is, which is extremely effective for protecting the piezoelectricity of the piezoelectric element. For example, it is possible to instantaneously determine whether or not the liquid surface position of the constant-temperature water is equal to or higher than the position of the split electrode used for irradiation by performing the measurement described in FIG. 11 without fail before the stirring operation is executed.

The phenomenon described in FIGS. 7 to 10 and the measurement results thereof are also useful for the chemical automatic analysis apparatus. A sample dispensed from the sample dispenser 105 shown in FIG. 1 and a reagent dispensed from the reagent dispenser 106 are weighed and dispensed by a syringe pump controlled with high accuracy. However, when a small amount of dispensing error is caused by some factor and the volume of the liquid dispensed to the reactor vessel 107 is different from a specified value, an automatic chemical analysis apparatus of the related art does not recognize the dispensing error and applies ultrasonic waves at a position aligned with the liquid surface position of a predetermined liquid volume.

At that time, when an actual liquid surface position is higher than the liquid surface position of the predetermined liquid amount, the stirring intensity by the ultrasonic waves is reduced and insufficient mixing occurs. On the other hand, when the actual liquid surface position is lower than the liquid surface position of the predetermined liquid amount, the ultrasonic waves radiated on the inner surface 702 of the reactor vessel are reflected in a state almost near the total reflection as described in FIG. 7 in addition to the mixing shortage. At this time, when the intensity is high enough for stirring, the piezoelectric element itself may be damaged by the reflected waves. According to the present example, this possibility can be avoided.

FIG. 12 shows an example of an operation procedure of the automatic chemical analysis apparatus according to the present example. First, the host computer and the impedance measuring circuit 204 apply a predetermined measurement voltage to each split electrode to measure the ImpS of the piezoelectric element (step S1). Then, the power amplifier 203 applies a predetermined stirring voltage to each split electrode to cause the piezoelectric element to generate sonic waves (sonic waves for stirring) (step S2). The measurement voltage can be a voltage smaller than the stirring voltage (for example, a weak voltage).

The "stirring voltage" and "measurement voltage" in this case do not need to be specific voltages and may be different voltages according to some conditions. In such a case, the maximum value of the measurement voltage can be made smaller than the minimum value of the stirring voltage.

The operation of the automatic chemical analysis apparatus corresponding to the measured ImpS is as described above. For example, the liquid surface position of the liquid to be stirred in the reactor vessel is detected before starting the stirring operation. When the error of the liquid surface position (the difference between the liquid surface position of the predetermined liquid amount and the actual liquid surface position) is within an allowable range from a chemical analytical perspective, the host computer of the automatic chemical analysis apparatus automatically determines or changes the split electrode to be driven, and it is possible to apply ultrasonic waves in accordance with the actual liquid surface position.

Thus, the ImpS measurement of the piezoelectric element according to the present example is performed on the active automatic chemical analysis apparatus to not only detect the abnormality of the piezoelectric element but also prevent the occurrence of the abnormality, and it is possible to significantly suppress the trouble of the automatic chemical analysis apparatus caused by the stirring mechanism 109.

The result of each ImpS measurement is stored and the fluctuation and transition of the measurement result are analyzed to detect a sign of abnormality or failure of the stirring mechanism 109, for example, when a measurement result that cannot occur by chance is obtained.

Example 1 of the present invention has been described. The automatic chemical analysis apparatus includes a function of determining whether or not the piezoelectric element is normal, a function of detecting the liquid surface position of the liquid to be stirred, and a function of detecting the liquid surface position of the constant-temperature water, and a part of these functions can be omitted as a modification.

These functions are only examples of functions utilizing the ImpS of the piezoelectric element, and other functions can be configured to be performed based on the ImpS of the piezoelectric element in place of or in addition to these functions. For example, it is possible to determine whether or not the piezoelectric element and the reactor vessel have a proper relative position relation by manually dispensing a certain amount of liquid in the reactor vessel with high accuracy by using a precise pipetter or the like and measuring where in the reactor vessel the liquid surface position of the liquid corresponding to the liquid amount is.

Example 2

In Example 1, an electronic circuit (host computer and impedance measuring circuit 204; impedance spectrum measurement circuit, hereinafter abbreviated as "ISMC") that measures the impedance spectrum in FIG. 3 is mounted on the automatic chemical analysis apparatus. Example 2 relates to an ImpS measurement device (electrical impedance spectrometry measurement device) which can be connected to the automatic chemical analysis apparatus without an ISMC (for example, the automatic chemical analysis apparatus of the related art). The differences from Example 1 are described below.

The ImpS measurement device according to Example 2 can be used as a maintenance tool for an automatic chemical analysis apparatus of the related art.

In ISMC (FIG. 3) according to Example 1, the DDS 301, the MCU 310, and the logarithmic amplifier 307 are the main parts, and these parts can now be packaged in a 10 mm or less IC. Therefore, the circuit part of ISMC can be configured on a substrate of, for example, 5 cm×9 cm (card size) or less. The overall thickness of the ISMC can be 10 mm or less. The ImpS measurement device can be made portable and convenience is improved by configuring the measurement device in such a small size.

Figure 13A:
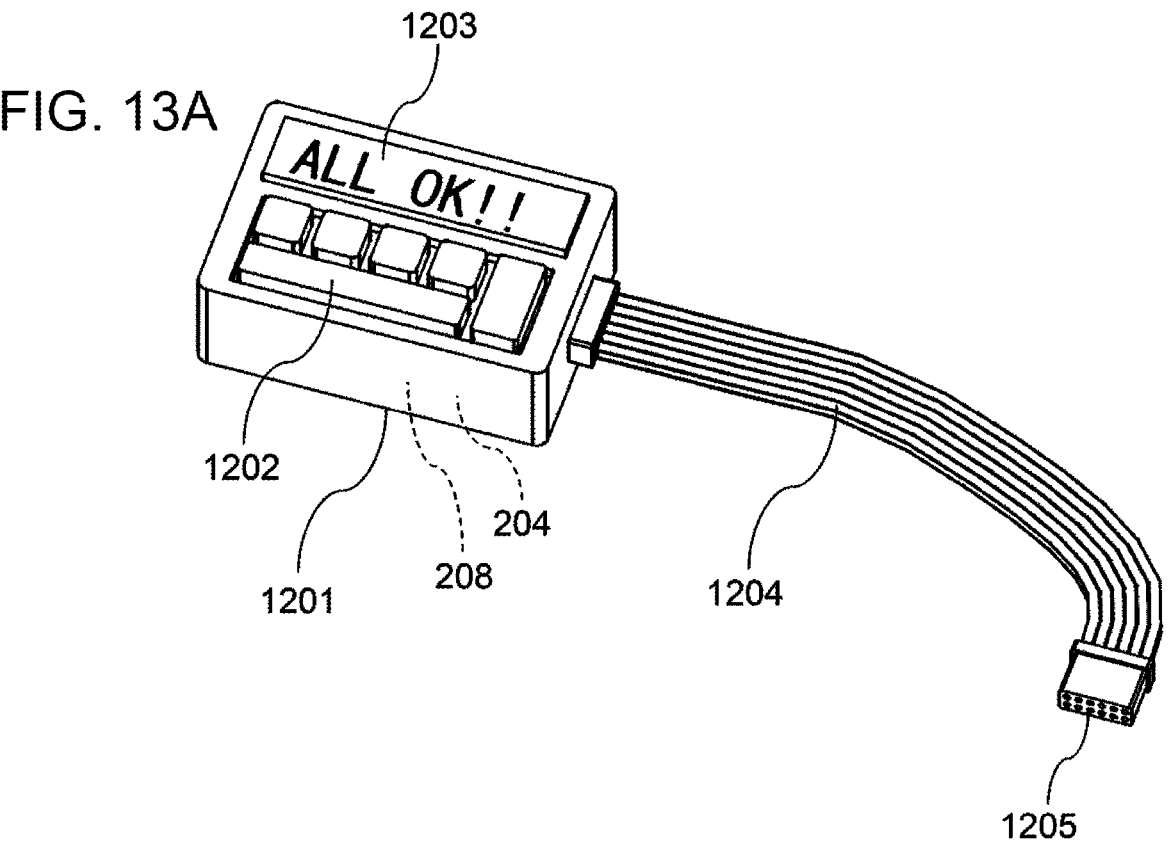
FIGS. 13A and 13B are diagrams showing an example of the configuration of an electrical impedance spectrometry device according to Example 2 and the connection thereof.

FIG. 13 shows an example of the configuration of the ImpS measurement device and the connection thereof. FIG. 13(a) is an example of the configuration of the ImpS measurement device. A portable case 1201 is used to configure the ISMC having a function equivalent to Example 1. That is, the ImpS measurement device includes the host computer, an impedance measuring circuit 204, and the relay group 208.

The ImpS measurement device according to Example 2 includes a key operation button 1202 and a display device 1203. The key operation button 1202 is an example of an input device for inputting an operation instruction to the host computer and the impedance measuring circuit 204. The display device 1203 displays information based on the measured ImpS under the control of the host computer.

The display device 1203 can display information indicating whether or not the stirring operation can be executed (that is, whether or not the stirring mechanism 109 is in a state in which the stirring operation can be properly executed). As a specific example, when the piezoelectric element is in proper contact with the constant-temperature water, information indicating that the stirring operation can be executed is displayed. In the example shown in FIG. 13(a), the message "ALL OK!!" is displayed as an example of information indicating that the stirring operation can be performed.

The display device 1203 can display information representing the liquid surface position of the liquid to be stirred in the reactor vessel. The display device 1203 can display information indicating the liquid surface position of the constant-temperature water. The display device 1203 may display other information.

The ImpS measurement device includes a cable 1204. One end of the cable 1204 is connected to the case 1201, and the other end is connected to a connector 1205. The cable 1204 connects the host computer, the impedance measuring circuit 204, and each of the split electrodes via the connector 1205.

Figure 13B:
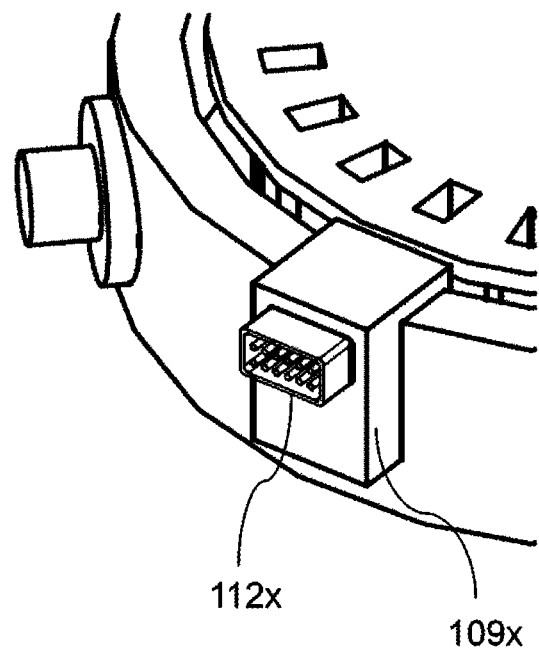

An automatic chemical analysis apparatus of the related art includes a connector 112x and a stirring mechanism 109x as shown in FIG. 13(b). The connector 1205 of the ImpS measurement device can be connected to the connector 112x of the automatic chemical analysis apparatus. Thus, the host computer and the impedance measuring circuit 204 can control the split electrodes of the automatic chemical analysis apparatus through the connector 1205.

According to such a configuration, the function described in Example 1 can be achieved even in Example 2. For example, it is possible to execute a function of determining whether the piezoelectric element is normal or not, a function of detecting the liquid surface position of the liquid to be stirred, a function of detecting the liquid surface position of the constant-temperature water, and the like even for an automatic chemical analysis apparatus of the related art. Thus, the effects equivalent to Example 1 can be obtained.

In Example 2 described above, the ImpS measurement device is a portable configuration using the case 1201, and the host computer and the impedance measuring circuit 204, the key operation button 1202, the display device 1203, and the relay group 208 are disposed in the portable case 1201. Here, "portable" means, for example, a size of 5 cm×9 cm×10 mm or less. However, a larger portable case can be used as a modification example. A non-portable ImpS measurement device (for example, an installation type) can also be configured.

REFERENCE SIGNS LIST

101: sample cup
102: sample disk
103: reagent bottle
104: reagent cooling disk
105: sample dispenser
106: reagent dispenser
107: reactor vessel
108: reaction disk
109: stirring mechanism
110: absorbance meter
111: constant-temperature bath
112: connector
201: piezoelectric element
202: jig
203: power amplifier (driver)
204: impedance measuring circuit (electronic circuit)
205: function generator circuit
206: terminal amplifier circuit
207: current monitor
208: relay group (switch device)
209: constant-temperature water (liquid that mediates sonic waves)
210: constant-temperature water-side electrode
211: split electrode (a plurality of electrodes)
212, 213: switch
214, 215: terminal
216: ground
217: output terminal
218: input terminal
219, 220: information and communication means
301: direct digital synthesizer (DDS)
302: amplifier
303: output terminal
304: input terminal
305: detection resistor
306: operational amplifier
307: logarithmic amplifier
308, 309: wiring
310: MCU
311: control signal
401, 402, 405, 406, 501, 502: profile group
404: resonance frequency
603: normal range
604: in-air range
701: proper position
702: inner surface of reactor vessel
704: progressive wave
705: reflected wave
706: plane on the side of a piezoelectric element that is in contact with constant-temperature water
801, 901, 1001: liquid to be stirred
803: intermediate range
1101: constant-temperature water (liquid that mediates sonic waves)
1201: portable case
1202: key operation button (input device)
1203: display device
1204: cable
1205: connector All publications, patents, and patent applications cited in the present specification shall be included in the present specification by means of citation.

The invention claimed is:

1. An automatic chemical analysis apparatus that dispenses a reagent and a sample to be analyzed into a reactor vessel and performs stirring by applying sonic waves to the reactor vessel, the apparatus comprising:
a constant-temperature bath for keeping the reactor vessel in contact with constant-temperature water;
a piezoelectric element mounted on the constant-temperature bath via a jig such as to contact the constant-temperature water on a constant-temperature water-side surface and generate the sonic waves;
a plurality of constant-temperature water-side electrodes provided to the constant-temperature water-side surface of the piezoelectric element and a plurality of electrodes that are provided to another surface of the piezoelectric element;
a driver that causes the piezoelectric element to generate the sonic waves by applying a voltage to each of the electrodes;
an electronic circuit that measures the electrical impedance spectrum of each of the electrodes by applying a voltage to each of the electrodes; and
a host computer configured to control the driver and the electronic circuit, wherein the host computer is configured to cause:
the electronic circuit to detect a liquid surface position of a liquid to be stirred based on the absolute value of an electrical impedance at the time of resonance of each of the electrodes, and
wherein the host computer is configured to:
determine that the liquid surface position is a proper position when the absolute value of all the electrodes is within a predetermined normal range,
estimate the liquid surface position according to the position of a specific electrode when the absolute value is within an intermediate range lower than the normal range in the electrodes above the specific electrode,
determine that the liquid surface position is higher than the proper position when the absolute value exceeds the normal range in all the electrodes, and
estimate the surface position of the constant-temperature water in the constant-temperature bath when the absolute value is within an air range lower than the intermediate range for any of the electrodes, and
wherein the host computer is further configured to control the driver to cause the piezoelectric element to generate the sonic waves in different modes according to the electrical impedance spectrum of each of the electrodes by applying a voltage only to the electrodes at and below the liquid surface position and the surface position of the constant-temperature water in the constant-temperature bath.

2. The automatic chemical analysis apparatus according to claim 1, wherein
the electronic circuit determines whether or not the piezoelectric element is normal based on the electrical impedance spectrum of each of the electrodes.

3. The automatic chemical analysis apparatus according to claim 1, wherein
the electronic circuit measures the electrical impedance spectrum of each of the electrodes before the driver causes the piezoelectric element to generate the sonic waves.

4. The automatic chemical analysis apparatus according to claim 1, wherein
the driver causes the piezoelectric element to generate the sonic waves by applying a predetermined stirring voltage to each of the electrodes, and
the electronic circuit measures the electrical impedance spectrum by applying a measurement voltage smaller than the stirring voltage to each of the electrodes.

5. An electrical impedance spectrometry device that is connectable to an automatic chemical analysis apparatus, wherein
the automatic chemical analysis apparatus has a function of dispensing a reagent and a sample to be analyzed into a reactor vessel and performing stirring by applying sonic waves to the reactor vessel,
the electrical impedance spectrometry device includes
a piezoelectric element that generates the sonic waves,
a plurality of electrodes that are provided to the surface of the piezoelectric element, and
a driver that causes the piezoelectric element to generate the sonic waves by applying a voltage to each of the electrodes, and
the electrical impedance spectrometry device comprising:
an electronic circuit that measures the electrical impedance spectrum of each of the electrodes;
an input device for inputting an operation instruction to the electronic circuit;
a display device that displays information based on the measured electrical impedance spectrum;
a cable that connects the electronic circuit and each of the electrodes; and
a switch device that switches the connection of the electronic circuit and each of the electrodes,
the electronic circuit detects a liquid level position of a liquid to be stirred based on the absolute value of an electrical impedance at the time of resonance of each of the electrodes,
wherein, the electronic circuit
determines that the liquid surface position is a proper position when the absolute value of all the electrodes is within a predetermined normal range,
estimates the liquid surface position according to the position of a specific electrode when the absolute value is within an intermediate range lower than the normal range in the electrodes above the specific electrode, and
determines that the liquid level position is higher than the proper position when the absolute value exceeds the normal range in all the electrodes, and
the driver causes the piezoelectric element to generate the sonic waves in different modes according to the electrical impedance spectrum of each of the electrodes by applying a voltage only to the electrodes at and below the liquid surface position.

6. The electrical impedance spectrometry device according to claim 5, wherein the electronic circuit, the input device, the display device, and the switch device are disposed in a portable case.

* * * * *